United States Patent [19]

Schultz

[11] 3,957,417

[45] May 18, 1976

[54] HEATING ORCHARDS WITH AN IMPROVED FUEL

[76] Inventor: Marvin M. Schultz, P.O. Box 11, Buena, Wash. 98921

[22] Filed: Apr. 12, 1974

[21] Appl. No.: 460,354

[52] U.S. Cl. .................................. 431/2; 47/2; 126/59.5; 208/15; 208/17
[51] Int. Cl.² ................................. A01G 13/06
[58] Field of Search ............... 208/15, 17; 47/2; 126/59.5; 431/2

[56] References Cited
UNITED STATES PATENTS

| | | | |
|---|---|---|---|
| 2,321,280 | 6/1948 | Brown | 208/17 |
| 3,809,057 | 5/1974 | Frost | 126/59.5 |

*Primary Examiner*—Herbert Levine
*Attorney, Agent, or Firm*—Seed, Berry, Vernon & Baynham

[57] ABSTRACT

A petroleum-derived solvent having a distillation range of from about 316°F. to 360°F. is added to hydrocarbon fuels, such as gasoline, diesel oil or heating oils, in a ratio of from about 1 part additive to 6–15 parts fuel. The additive, when added to No. 2 diesel fuel and the fuel burned in conventional, non-pressurized orchard heaters, gives reduced particulate emissions and a higher BTU per pound value of fuel burned.

2 Claims, No Drawings

HEATING ORCHARDS WITH AN IMPROVED FUEL

BACKGROUND OF THE INVENTION

1. Field of the Invention

This invention relates to an aliphatic, hydrocarbon solvent added to hydrocarbon fuels, such as gasoline, diesel fuel or heating oil, to improve the burning characteristics thereof.

2. Prior Art Relating to the Disclosure

The use of non-pressurized orchard heaters which burn fuel oil or diesel oil has been prohibited in many areas due to violation of air quality standards. This has forced many orchard growers to discontinue use of their existing non-pressurized heaters and purchase units which are capable of operating without violation of the air quality standards. Although varying additives for fuels for accomplishing various purposes are known, no reference was found teaching the combination of a highly refined, petroleum-derived, aliphatic, hydrocarbon solvent of the type disclosed with hydrocarbon fuels for the purposes described.

SUMMARY OF THE INVENTION

It is a primary object of this invention to provide a fuel composition consisting essentially of an additive for hydrocarbon fuels which improves the burning characteristics of the fuel, reduces the air pollutant emissions and increases the BTU value per pound of fuel burned.

This and other objects are accomplished by the addition of a highly refined, aliphatic, hydrocarbon solvent having a distillation range of from about 316°F. to 360°F. to a hydrocarbon fuel, such as gasoline, diesel oil or heating oil, in a ratio of 1 part additive to 6–15 parts fuel.

DESCRIPTION OF THE PREFERRED EMBODIMENTS

The additive used in this invention is a highly refined, petroleum-derived, aliphatic, hydrocarbon solvent having a distillation range of from 316°F. to 360°F. The additive is commercially available. One such product is marketed by Union Oil Company under the trade name "Union S-76 Solvent."

The additive is incorporated in a hydrocarbon fuel, such as diesel oil, heating oil and gasoline, in amounts ranging from about 1 part additive to 6–15 parts fuel, preferably 8–12 parts fuel.

The fuel composition including the additive incorporated in diesel oil may be used for firing orchard heaters, either pressurized or non-pressurized. The fuel mixture may also be used as an aid in open-field burning of agricultural wastes. The additive may be incorporated in gasoline and burned in automobiles, trucks, etc. or incorporated in heating oil used for heating homes, offices or other commercial structures.

A pot-type orchard burner of a type referred to by the industry as a "lazy flame" burner, commonly found in use having an eight-gallon-capacity pot, was adjusted by means of the primary draft openings to successive positions ranging from approximately 2½ square inches total opening to ½ square inch. The fuel mixture used in the orchard heater consisted of 80% No. 2 diesel fuel and 20% of the aliphatic, hydrocarbon solvent described previously. The mixture was ignited, and smoke intensity was observed. The smoke intensity was very light and barely perceptible through the draft opening range of ½ square inch to 2½ square inches. Samples were collected of the particulate emissions with the draft opening at approximately 1½ square inches. The collected particles were analyzed for metallic constituents by spectographic methods and were anaylzed by thin-layer chromatography for 3,4-benzopyrene. The results of these tests were as follows:

No significant metallic constituents were found.

Some benzopyrene was found, but not in any appreciable extent.

Particulate emission was about 17 micrograms per thousand BTU's fuel burned, below the level required by the air quality regulations. The particulate emission rate measurements were carried out by personnel of the Yakima County Clean Air Authority (Yakima, Wash.) in accordance with established test procedures.

Other evaluation studies on burning of the diesel fuel with the additive indicated an increase of about 2.1% in the BTU heat output of the fuel mixture over diesel fuel alone. A comparison between diesel fuel alone and diesel fuel with 20% by volume of the additive added was made based on the evaluation of heat of combustion, which is a measure of the energy available from the fuel. The diesel fuel alone had a heat of combustion of 18,963 BTU's per pound of fuel, while the diesel fuel plus additive had a heat value of 19,360 BTU's per pound of fuel.

The embodiments of the invention in which a particular property or privelege is claimed are defined as follows:

1. A method of heating orchards comprising:
   providing an orchard heater for combusting an air-fuel mixture, and
   combusting a fuel mixture in the heater consisting essentially of a hydrocarbon fuel selected from a group consisting of diesel oils, heating oils and gasoline, and a highly refined, petroleum derived, aliphatic, hydrocarbon solvent additive having a distillation range of from 316°F. to 360°F., the volume ratio of additive to fuel ranging from 1 part additive to 6–15 parts fuel.

2. A method of heating orchards comprising:
   providing an orchard heater for combusting an air-fuel mixture, and
   combusting a fuel mixture in the heater consisting essentially of diesel oil and a highly refined, petroleum-derived, aliphatic, hydrocarbon additive having a distillation range of from 316°F. to 360°F., the volume ratio of additive to diesel oil ranging from 1 part additive to 6–15 parts diesel oil.

* * * * *